United States Patent [19]
Benford, Jr. et al.

[11] 3,793,053
[45] Feb. 19, 1974

[54] GLASS DECORATION

[75] Inventors: Charles L. Benford, Jr.; James E. Mielke, both of Toledo, Ohio

[73] Assignee: Owens-Illinois, Inc., Toledo, Ohio

[22] Filed: June 24, 1970

[21] Appl. No.: 59,840

Related U.S. Application Data

[60] Division of Ser. No. 548,908, May 10, 1966, abandoned, Continuation of Ser. No. 64,081, July 27, 1970.

[52] U.S. Cl. .................. 117/38, 117/45, 117/70 B, 117/124 R, 117/124 A, 117/161 UC, 117/161 UN
[51] Int. Cl. .......................... C03c 5/00, C03c 7/00
[58] Field of Search ......... 117/38, 45, 70 B, 70 R, 117/161 UC, 161 UN, 124 A, 124 R; 260/41, 875, 41 A; 252/77.2

[56] References Cited
UNITED STATES PATENTS

| | | | |
|---|---|---|---|
| 2,682,480 | 6/1954 | Andrews | 117/129 |
| 3,084,129 | 2/1963 | Hoffman | 260/41 R |
| 3,166,525 | 1/1965 | Perry | 117/161 UN |
| 3,061,559 | 10/1962 | Stoner | 260/895 |
| 2,828,194 | 3/1958 | Hopkins | 252/79.2 |
| 3,345,320 | 10/1967 | Uffner | 260/31.2 |

*Primary Examiner*—Alfred L. Leavitt
*Assistant Examiner*—M. F. Esposito
*Attorney, Agent, or Firm*—E. J. Holler

[57] ABSTRACT

A fast drying, fluid, glass decorating composition especially suitable for silk screen decorating methods and having from about 40 to about 60 percent by weight of a finely divided ceramic and/or glass frit and having as the balance of the composition a liquid vehicle as a carrier for the frit and comprising, on a percent by weight basis, about 0.8 to about 6.5 percent of a copolymer of N-vinyl pyrrolidone and a vinyl substance such as vinyl acetate, and about 60 to about 95 percent of an aliphatic organic solvent containing oxygen in its structure and having a boiling temperature within the temperature range of from about 100°C. to about 190°C. The liquid vehicle preferably may also include sucrose benzoate and/or an acrylic resin, and an anionic surfactant.

13 Claims, 3 Drawing Figures

GLASS DECORATION

The present invention relates to glass manufacture and is a division of co-pending application Ser. No. 548,908, filed May 10, 1966, now abandoned in favor of streamlined continuation application Ser. No. 64,081 filed July 27, 1970.

More particularly, the present invention relates to the art of decorating glass. Still more specifically, the present invention is concerned with improvements in the application of ceramic frit decorations onto a previously-formed container, such as a bottle, tumbler, etc.

It has, of course, been deemed desirable for many years to apply artistic decorations and/or printed information onto glass containers in order to make them more visually appealing or to identify, for example, the contents within, or the name of the manufacturer, wholesaler, distributor, etc.

The decoration of a glass container for these purposes can be accomplished with organic inks, precious metal fluxes and with vitreous enamel-type compositions. The latter are commonly referred to in the art as ceramic frits. These are generally finely-divided, low melting glass compositions contained in a carrier vehicle and applied to the glass container by spraying, brushing, or by the silk screen technique. U.S. Pat. No. 2,916,393 issued to A. Velonis is generally disclosive of these several techniques and, as well, discusses the flux or low melting frit decorating composition. As noted in this patent, it is conventional to employ in the frit composition a powdered low melting white glass having, for example, a melting point of 1,000° F. (as compared to the melting point of conventional tumbler glass of 1,300° F.). The Velonis patent also discloses that the low melting glass is included in a carrying element or vehicle in the form of dammar varnish or other fossil resins in a suitable oil vehicle. When the frit composition is eventually fired, the organic constituents, being primarily carbonaceous, burn off, leaving the frit (low melting glass particles) fused or sintered to each other and to the glass substrate.

In the decoration of glass containers and bottles with frit type compositions, difficulty has been experienced in attempting to achieve an ultimately decorated container bearing several different colors. A two or three color decoration is desirable in order to achieve a compatible design of complementary or contrasting color. One color may take the form of an outline for the printing (of a second or even a third coloration). For each color, of course, it is necessary to apply a different deposit of the frit composition. The frit compositions, of course, will differ primarily in the coloring pigmentation (usually oxides) included therein. These can take the form of the usual glass colorants or certain precious metal flux materials. In any event, this approach has necessitated an undesirably lengthly decoration cycle since after the first deposit of a decorating frit composition has been applied, it must be fired to harden it before applying the second frit decoration composition. Firing is necessary in order to drive off the liquid carrier utilized as a vehicle for the frit and lending the capability of being applied by the silk screen technique. In the absence of the firing, the liquid carrier or vehicle remains in a plastic deformable condition on the glass. Consequently, a second application of a decorating composition, in superimposed or registering relationship with the first decoration, will necessarily involve physical contact between the first applied decoration and the silk screen. The obvious resultant of this contact is smudging or smearing of the first decoration or even a removal (through pickup) of the first decoration. To avoid this, as indicated hereinabove, it has heretofore been necessary to subject the glass container to intermediate firing or fusion steps in between each of the different decorating stages. It may be stated here, parenthetically, that a few air-dry types of ink decoration compositions are known, but these are completely different materials and, in the art, quite distinct from the ceramic frit type decorations.

With the advent of more completely automatic and rapid operating decorating machinery (see, for example, Johnson Pat. No. 3,146,704), it has become more and more desirable for improved ceramic frit types of decorating compositions to be developed which are capable of drying or hardening without intermediate firing.

With the foregoing general introduction, it may be stated that it is a general object of the present invention to provide a frit containing decoration composition comprising a novel combination of ingredients which cooperate to overcome the problems and difficulties referred to generally above and, as well, possess properties which are extremely desirable, as will appear from the further objects, examples and more specific disclosure appearing hereinafter.

It is a further object of the present invention to provide a unique vehicle for finely-divided ceramic frit particles; which vehicle is capable of drying to a non-tacky state without the necessity of high temperature fusion or firing of the frit composition.

It is still another object of the present invention to provide a frit composition which, when applied to the glass substrate and heated mildly, becomes firmly adhered to the glass substrate and relatively impervious to subsequent and repeated contacts with the silk screen as encountered in the application of subsequent layers of decoration material.

It is a particular object of the present invention to provide a frit composition formulation which is capable of maintaining the relatively heavier and more dense vitreous particles uniformly suspended within the total composition, thereby avoiding the propensity to settle (by reason of gravity) to the bottom of the container wherein maintained.

It is additionally an object of the present invention to provide a unique frit composition which includes ingredients as lend extraordinary toughness and hardness to the silk screened deposition of the frit decoration coating without the necessity of elevated temperature firing whereby subsequent superimposed application of differently pigmented frit compositions of the present invention may be applied.

It is additionally an object of the present invention to provide a frit decoration composition; the formulation of which includes compatible constituents as furnish a homogeneous liquid mixture which yields a proper viscosity or fluidity as to be conveniently applied by silk screen technique.

It is a companion object of the present invention to provide a fluxing-type frit decoration composition which possesses a conveniently silk screenable viscosity and fluidity without the necessity of maintaining the decoration composition at an elevated temperature.

It is also an object of the present invention to provide an organic vehicle/vitreous frit composition which possesses properties by reason of unique cooperation of the ingredients therein as to extend the life of silk screens utilized in the application of the decoration to the appropriate substrate.

It is still another object of the present invention to provide such a frit composition; the organic vehicle component of which is essentially completely fugitive in that the temperature of fusion or the sintering temperature reveals the organic component to be completely removed from the decoration situs without disruption of any overlying deposition of a similarly formulated decoration composition.

The foregoing, as well as other objects of the present invention, will become apparent to those skilled in the art from the following detailed description, recitation of examples and annexed sheets of drawings on which there are presented, for purposes of illustration only, several views of a glass container decorating machine modified as to permit multi-color decoration in accordance with the method of the present invention and particularly employing the novel decoration composition thereof.

The above-enumerated objects of the present invention are accomplished through the use of a novel glass decorating composition formulated to comprise a cooperative combination of components inclusive, in addition to the finely-divided ceramic frit, of a liquid vehicle ideally adapted to contain said frit is dispersed and silk screenable disposition; said vehicle including a N-vinyl pyrrolidone resin and a solvent which is compatible with the resinous components and is capable of adjusting the total composition to a viscosity well-suited for silk screen application to the glass substrate. The glass decorating composition, and particularly the vehicle, should desirably contain, in addition to those substances enumerated, an acrylic resin as described in more detail hereinafter. The acrylic resin appears to impart to the composition a degree of integrity and toughness as resists marking or scratching during the silk screen application of a second or third decoration over the first decoration and without the necessity of an elevated temperature fire to fuse the ceramic frit. In accordance with one preferred practice of the present invention, these ingredients are combined by mixing them together in particular proportions which has been found to yield a tailored combination of desirable properties including a proper viscosity at room temperature, non-clogging of the small screen openings of the silk screen, durable adherence to the substrate and, once applied, extremely rapid drying whereby a successive complementary colored glass decorating ceramic frit decoration can be applied in superimposed relationship with the first deposit of glass decorating composition without any disruption, marring or smudging of the first applied decoration. Integrity and toughness, as resists marking, can also be imparted to the decoration composition by the addition of sucrose benzoate, and related esters of aromatic monocarboxylic acids, instead of the acrylic resin.

It has been additionally determined in the course of our investigation that the compositions in accordance with this invention should include a minor amount of a surfactant, particularly one imparting thixotropic properties thereto. The combination of the particular resinous components, the proper surfactant and the appropriate organic solvent has been found to provide a vehicle capable of carrying the finely-divided ceramic frit particles uniformly distributed therethrough and imparting to the total composition a uniform viscosity and one which demonstrates easy passage through the openings in the silk screen with a minimum of accumulated wear, thereby extending to a remarkable extent the life expectancy of the silk screen elements.

The brief description of the drawings to follow will provide a better understanding of the practice of the present invention, particularly with respect to the employment of the novel glass decorating compositions.

Figure 1:
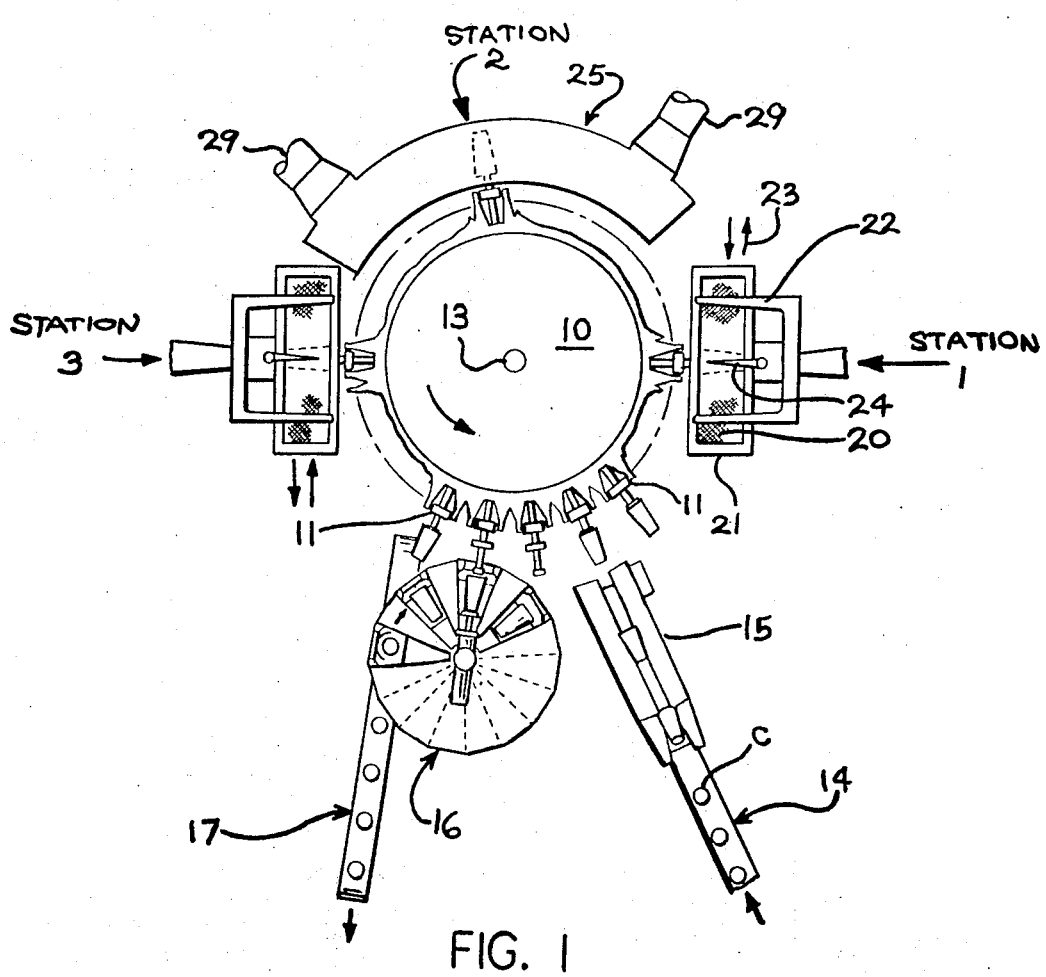
FIG. 1 is a schematic top plan view of a rotary glass decorating machine adapted for successive applications of a ceramic frit decoration composition in accordance with the present invention.
Figure 2:
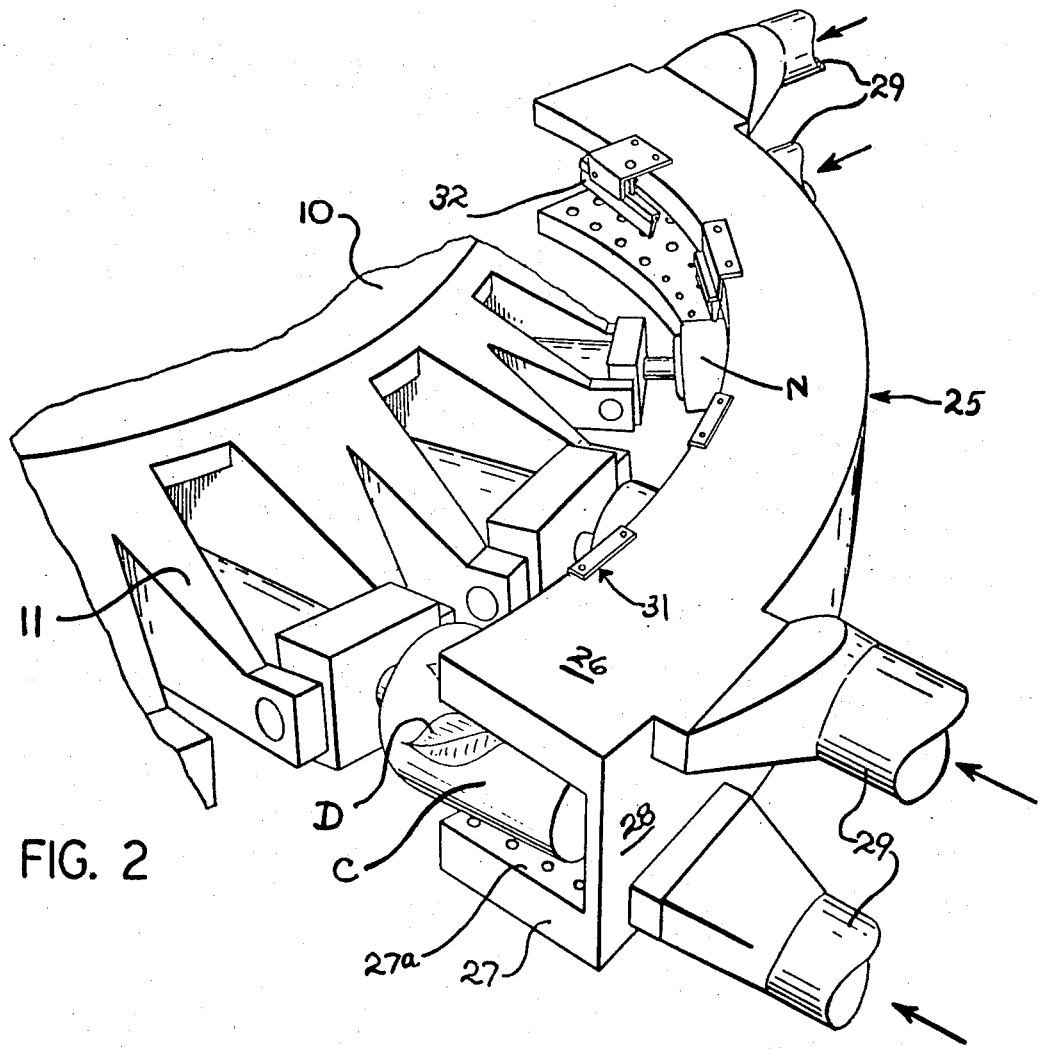
FIG. 2 is a three-quarter perspective view of a segment of the rotary machine wherein an intermediate step between successive depositions of a glass decorating composition is carried out.

Referring now to FIG. 1, a spindle carriage or turret 10 has mounted peripherally thereon a multiplicity of spindle units 11 arranged in an annular series with the spindles equally spaced apart. The carriage or turret 10 is so mounted and controlled so as to provide intermittent step-by-step rotation about the axis of the central vertical axis 13. Glass containers C to be decorated travel on a conveyor 14 to the unloader mechanism 15 which locates the containers onto the spindles. The latter, of course, may be a hand operation. Once on the spindles, the containers are advanced by the rotation of the carriage in intermittent stop-and-go fashion proceeding in a circular path through the stations identified as Station 1, Station 2 and Station 3 in succession; after which, they are removed from the spindles, either by hand or an automatic star-wheel type take-off device 16, from which they are delivered to a take-off conveyor 17. Decoration Stations 1 and 3 are essentially identical in construction; each comprising a planar piece of silk screen 20 mounted in a rectangular frame 21 held by a bracket 22 controlled to move the frame and screen in reciprocating fashion or to-and-fro fashion, as indicated by the arrows 23. A squeegee blade 24 contacts the upper surface of the silk screen as the frame and screen move in either direction. An amount of decorating composition, particularly of that of the present invention, is metered onto the upper surface of the screen as a container comes to rest beneath the screen (shown in dotted outline at Station 1). The container is tilted slightly upwardly into contact with the screen. At this point, appropriate cam elements provide simultaneous rotation of the container and movement of the screen in one direction or the other, whereupon the stationary squeegee forces an amount of the frit containing decoration composition through the voids thereof onto the surface of the container in the desired preselected pattern or decoration. In FIG. 2, the decoration, a leaf, is identified by the reference letter D.

After being decorated at Station 1, the containers, still held by the spindles, are passed, still in intermittent stop-and-go fashion, to Station 2 where they pass through a hot, air-drying manifold 25 (shown in more detail in FIG. 2). The drying manifold consists of curved upper and lower plates 26 and 27 connected together by a wall plate 28 and the radius of curvature being concentric with the path of the containers. The plates 26 and 27 are hollow and each is connected near its end extremity with inlets 29 for continuous supply of hot air. The upper wall 27a of hollow lower plate 27 and the lower wall (not shown) of hollow upper plate 26 are perforate, as shown in FIG. 2, as to provide a uniform steady stream of the hot air introduced to the respective plates, in the manner shown. In proceeding through the manifold 25, and more particularly between the hollow plates 26 and 27, the containers are rotated several times by the array of contact members 31 which are attached to the upper plate 26 and depend downwardly therefrom, terminating in a flexible rubber blade 32 adjustably mounted to contact the neck portion N of the container and thereby turn it an amount dependent upon the length of the rubber blade 32.

From Station 2, the containers bearing a first deposition of a glass frit decorating composition, which is now dry by reason of the novel formulation of the decorating composition, proceed to Station 3 wherein another deposition of a similar ceramic frit decorating composition is applied via a silk screen in the same manner as described at Station 1. It will be appreciated that appropriate cam elements control the movement of the silk screen frame and rotation of the container as to apply the second deposition in registered orientation with the first applied decoration. From Station 3, the containers now bearing two decorations proceed to the take-off device 17 from which the containers pass to the conveyor 17. The containers may now be given an additional mild hot, air-drying treatment or they may proceed directly to the firing step to fuse the ceramic frit particles together and onto the glass substrate.

More complete details as to the construction and operation of the glass decorating machinery components, referred to hereinabove may be had by reference to U.S. Pat. No. 2,885,957; which patent is assigned to the same assignee as the present application.

Figure 3:
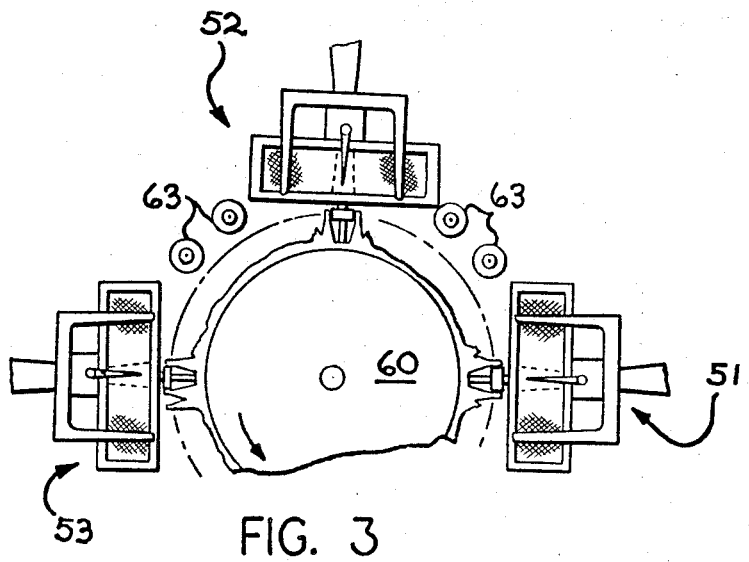
FIG. 3 is a view similar to FIG. 1, but illustrating a modified machine in accordance with the present invention.

In FIG. 3, there is illustrated an essentially identical apparatus, but including three decoration Stations 51, 52 and 53 spaced at quadrant positions about the turret 60. Located between Station 51 and Station 52 are a plurality of infrared ray emitting bulbs 63. These are located preferably above and below the intermittently moving containers whereby the energy effectively dries the first applied decoration. A similar array of infrared ray emitting bulbs are located between the Station 52 and Station 53 in order that the second deposition of ceramic frit composition can be dried before application of the third deposition of ceramic frit glass decorating composition.

The compositional analysis of a ceramic frit of utility for inclusion in decorating compositions of the present invention is given in Table 1. Table 1 also includes, in terms of compositional analysis, the range of percent for the several listed oxides. A frit yielding a compositional analysis in accordance with Table 1 will exhibit a normal fluxing temperature of 900° – 1,050° F.

TABLE 1

| Oxides | Amount Percent by Weight | Range Percent by Weight |
|---|---|---|
| $SiO_2$ | 30 | 28–36 |
| PbO | 54 | 52–58 |
| $Na_2O$ | 3.7 | 3.5–4.0 |
| $TiO_2$ | 3.1 | 2.5–4.5 |
| $R_2O$ | 1.4 | 1.2–2.0 |
| $R_2O_3$ | 2.8 | 2.5–4.5 |
| Colorant | 5 | 5–10 |

As indicated hereinabove, the ceramic frit is first ground to a finely-divided condition, usually in a ball mill or a rod mill. The ceramic frit most preferably ranges in size from about 12 microns to about 2 microns.

In the decorating composition of the present invention, the liquid vehicle is a functionally important component. As mentioned earlier herein, the vehicle is composed of a number of different ingredients, each of which, it has been determined, contributes a particular property of unique effect in terms of the ultimate behavior (overall properties) exhibited by the decorating compositions. One of the principal components of the vehicle is a vinyl pyrrolidone resin; specifically a polymerizate of vinyl pyrrolidone and a vinyl substance copolymerizable therewith. Vinyl esters such as vinyl acetate, vinyl propionate, vinyl butyrate are typical of the latter. Polyvinyl pyrrolidonevinyl acetate copolymers (PVP/VA) are available as aqueous emulsions containing 40 to 50 percent solids. The PVP/VA component contributes to the decorating composition a high degree of adhesiveness to the glass substrate, avoiding thereby any loosening of the silk-screen-applied coating decoration as was heretofore frequently encountered during the application of a second deposition of a decorating composition due to contact of the decoration by the silk screen itself or with a frame member.

The surfactant is preferably one which imparts thixotropic character to the total composition. The effect sought here is two-fold. Thus, we desire to provide a composition which is conveniently applied by silk screen application. The composition therefore should be one which exhibits a reduction in viscosity as it is being forced through the interstices of the silk screen; that is, as the composition is subjected to stress. This aids in extremely fine line definition whereby the quality of the art decoration or printing is at a maximum. It is also desired that the frit containing composition pass through the openings in the silk screen with a minimum of physical abrasion between the filaments of the silk screen and the rather abrasive frit. The surfactant likewise assists in the accomplishment of this result. The sulfonated castor oils are anionic type surfactants which contribute to the system, in which included, a thixotropic character; that is, as the composition is put in stress by forcing it through an orifice or moving it, the viscosity of the system appears to exhibit a lowering as compared to the viscosity of the system measured under static or at-rest conditions. Another anionic type surfactant is, for example, sulfonated naphthalene. Nopco Chemical Company markets a line of this type of surfactant under the tradename "Nopcosant." Sodium alkyl naphthalene sulfonate is another anionic compound and is marketed by Onyx Chemical Corporation under the tradename "NSAE Powder." Sodium xylene sulfonate marketed by Stepan Chemical Company under the tradename "Ninex 303" is another anionic surfactant. Another representative surfactant is potassium xylene sulfonate marketed by Ultra Chemical Company under the tradename "Ultra KXS."

The decorating compositions of the present invention should desirably include, as an additional component of the vehicle, a small amount of an acrylic resin. These resins are usually prepared by an emulsion technique; although for relatively low molecular weight polymerizates, a solvent polymerization system may be employed. Most desirably, we employ, as a vehicle component, a copolymer of methyl methacrylate and normal butyl methacrylate. The inclusion of these resins in the vehicle yields a silk screen deposit which when dried (upon exposure to the mild hot air oven) is noted by its toughness, lending an imperviousness to the deposition whereby no squeegee marks are imparted to the first deposition by subsequently applied silk screen decorations. Acrylic resins derived from a one to four carbon alkyl substituted ester of alpha methyl acrylic acid are preferred components of the vehicle for the decorating compositions of the present invention.

The vehicle, since it must be a liquid for successful silk screen application, must include an appropriate solvent as will be compatible with the resinous components of the vehicle and will create the desired viscosity. The solvent should also possess the proper volatility as will insure its continued presence during preparation of the decorating composition and during silk screening, while at the same time insuring substantial elimination thereof upon exposure to relatively mild hot air, generally in the neighborhood of 140° – 160° F. Generally, we prefer an organic solvent which has a boiling point ranging from about 100° C. to about 190° C. (212° – 374° F.). Solvents particularly preferred in the practice of the present invention are compounds containing a carbon oxygen bond as represented by the others, alcohols, ketones, glycols, esters and glycol ethers.

The following is a list of solvents which may be used in the practice of the present invention: methyl isobutyl carbinol having a boiling point of 131° C.; normal butyl alcohol - b.p. 117° C.; hexyl alcohol - b.p. 151° C.; 2-ethyl hexyl alcohol - b.p. 183° C.; propyl butyl ether - b.p. 117° C.; butyl ether - b.p. 137° C.; ethyl hexyl ether - b.p. 137° C.; dipropyl ketone - b.p. 144° C.; methyl propyl ketone - b.p. 101° C.; butyl acetate - b.p. 122° C.; isobutyl acetate - b.p. 113° C.; methyl amyl acetate - b.p. 144° C.; hexyl acetate - b.p. 164° C.; cellosolve (glycol mono ethyl ether) - b.p. 135.1° C.; butyl cellosolve (glycol mono butyl ether) - b.p. 170° C.; methyl cellosolve (glycol mono methyl ether) - b.p. 124° C.; methyl cellosolve acetate (glycol mono methyl ether acetate) - b.p. 143° C.; cellosolve acetate (betaethoxy ethyl acetate) - b.p. 156° C.; ethyl lactate - b.p. 154° C. The foregoing compounds are representative of the aliphatic type organic solvents which include a carbon-oxygen bond and which are therefore preferred solvents in accordance with the present invention.

In place of the acrylic resins, the vehicle or the compositions of the present invention may include an approximately equal weight amount of sucrose benzoate which is an ester of an aromatic monocarboxylic acid and a carbohydrate, specifically a disaccharide.

Compositions representing preferred formulations in the way of combinations of frit and vehicle components are set forth in the following tables, e.g., Table 2 and Table 3. Referring to the tables, the composition ingredient is identified in the lefthand column and the relative amount by weight of each ingredient is given in column 2. Also in column 2, the amounts in parenthesis are the amounts of the individual vehicle components which, when added together, yields the total parts by weight of the vehicle. Column 3 also recites the amount of ingredients in terms of weight percent on the basis of total composition. Column 4 includes the percent of total composition for each ingredient in terms of a preferred minimum and maximum. The last column contains the minimum and maximum of each vehicle ingredient in terms of the percent of vehicle.

TABLE 2

| Substance | Parts by Weight | Total Composition (percent) | Percent of Total Composition (range) | Percent of Vehicle (range) |
|---|---|---|---|---|
| FRIT | 15.0 | 47.6 | 40–60 | |
| VEHICLE | 16.5 | 52.4 | 60–40 | |
| PVP/VA[a] | (1.25) | (4.0) | 0.8–6.5 | 1.6–13.0 |
| Acrylic Resin[b] | (0.75) | (2.4) | 1.5–6.5 | 3.0–13.0 |
| Surfactant[c] | (0.75) | (2.4) | 0.6–3.2 | 1.2–6.4 |
| Cellosolve | (12.5) | (39.6) | 30–48 | 60–96 |
| Butyl Cellosolve | (1.25) | (4.0) | 1.0–7.0 | 2–14 |
| Total/Vehicle | 31.5/(16.5) | 100/(52.4) | | | a. Poly (N-vinyl pyrrolidone-vinyl acetate copolymer), an emulsion (45 percent solids) marketed as "Polectron 845" by Antara Chemicals, New York, N.Y.
b. Copolymer of methyl and n-butyl methacrylate marketed as "Lucite 2013" by E. I. duPont, Wilmington, Delaware.
c. Sulfonated castor oil, an anionic thixotropic surfactant marketed under the trademark "Thixcin-E" by Baker Castor Oil Company, Bayonne, N.J.

TABLE 3

| Substance | Parts by Weight | Total Composition (percent) | Percent of Total Composition (range) | Percent of Vehicle (range) |
|---|---|---|---|---|
| FRIT | 15.0 | 50.0 | 40–60 | |
| VEHICLE | 15.0 | 50.0 | 60–40 | |
| PVP/VA[a] | (1.5) | (5.0) | 0.8–6.5 | 1.6–13.0 |
| Sucrose benzoate | (1.0) | (3.3) | 1.5–6.5 | 3.0–13.0 |
| Surfactant[b] | (0.75) | (2.5) | 0.6–3.2 | 1.2–6.4 |
| Cellosolve | (10.5) | (35.0) | 25–45 | 50–90 |
| Butyl Cellosolve | (1.25) | (4.2) | 1.0–7.0 | 2.0–14.0 |
| Total/Vehicle | 30/(15) | 100/(50) | | | a. Same as in Table 1
b. Same as fn. (c) in Table 1

A decoration composition prepared according to the formulation of column 2 in Table 2, with all the ingredients thoroughly mixed together, exhibits a paste-like viscosity which is readily applied to a glass container via a silk screen technique as illustrated in the drawings. When the decoration-bearing container is passed through the mild hot air heat manifold 25, controlled to issue a stream of air measuring 155° F., which passage takes about 8–10 seconds, the decoration is found to be completely nontacky. A second deposition, partially superimposed on the first decoration, of an identical decorating composition, differing only in coloration, results in no damage to the first decoration by reason of contact with the silk screen or otherwise, nor any mixture of the two successively applied decorations. When fired at 1,000° F., the ceramic frit component fuses together and to the substrate, while the organic constituents, e.g., the vehicle, is burned off without any disruption of the second decoration. Practically identical results were obtained with a glass decorating composition in accordance with the formulation at column 2 of Table 3.

For optimum results in glass decoration, having in mind quality of line definitions, permanence, efficiency, unit speed and absence of difficulties and rejects, the vehicle and the frit should be present in an amount ranging from 40–60 percent of each in the total composition. Furthermore, the individual vehicle ingredients, namely, the resinous components, surfactant and solvent, should most desirably be maintained within the range of percentages set forth at Tables 2 and 3. Inclusion of higher or less amounts of these ingredients will result in shortcomings with respect to the quality of the decoration or rate of production. For example, changes in the solvent or the amount thereof will adversely affect the viscosity or the uniformity of the viscosity so that the composition will not successfully pass through the screen, or will pass too easily leading to smearing and smudging. Solvent variations can also result in premature thickening which clogs the screen, or to insufficient drying which results in smearing when the second decoration is applied. Marked variations in the resin system will lead to weak depositions or depositions not securely adhered to the substrate even after successful drying with consequent smudging and removal when the second decoration is applied.

Departures from the desired formulation as to surfactant likewise leads to viscosity problems as well as premature deterioration of the silk screen.

In accordance with the patent statues, we have set forth in specific detail identities and amounts of specific materials which have been found to yield the optimum in properties including integrity of decoration, adhesiveness to the substrate and particularly the attribute of exhibiting quick drying whereby multiple depositions of glass decorating compositions may be applied without intermediate firing. It is intended, of course, that within this framework many obvious modifications will suggest themselves to those skilled in the art and such are to be considered as within the scope of the present invention unless clearly excluded by the language of the appended claims.

We claim:

1. The method of decorating a glass substrate comprising the steps of:
   providing a decorating composition having a paste-like consistency and containing from about 40 percent by weight to about 60 percent by weight of finely divided frit admixed with a liquid vehicle consisting essentially, on a percent by weight basis of total vehicle, of
   from about 1.6 percent to about 13.0 percent by weight of a copolymer of N-vinyl pyrrolidone and a copolymerizable vinyl ester selected from at least one of the group consisting of vinyl acetate, vinyl propionate and vinyl butyrate,
   optionally from about 1.2 percent to about 6.4 percent by weight of an anionic surfactant,
   optionally from about 3.0 percent to about 13.0 percent by weight of one of the group consisting essentially of
   an acrylic resin, and
   an ester of an aromatic monocarboxylic acid and a carbohydrate,
   an aliphatic organic solvent containing oxygen in its structure and having a boiling point temperature within the temperature range of from about 212°F. to about 374°F.;
   screening said decorating composition through a screen onto the surface of said glass substrate in a preselected pattern defined by the openings in said screen;
   mildly heating said pattern of decorating composition for sufficient time to convert said pattern of decorating composition from said paste-like consistency to a dry nontacky condition, such heating being equivalent to heating said pattern at a temperature of from about 140°F. to about 160°F. for up to about 1 minute;
   subsequently heat fusing said pattern to said glass substrate.

2. The method as defined in claim 1, wherein said anionic surfactant is sulfonated castor oil.

3. The method as defined in claim 1, wherein said acrylic resin is derived from a one to four carbon atom alkyl substituted ester of alpha methacrylic acid.

4. The method as defined in claim 1, wherein said carbohydrate is a disaccharide.

5. The method as defined in claim 1, wherein said ester of an aromatic monocarboxylic acid and a carbohydrate is sucrose benzoate.

6. The method as defined in claim 1, wherein said organic solvent is at least one of the group consisting of ethers, alcohols, ketones, glycols, esters and glycol ethers.

7. The method as defined in claim 6, wherein said solvent is from the group consisting of glycol ethers.

8. The method as defined in claim 7, wherein said solvent is a mixture of glycol mono ethyl ether and glycol mono butyl ether.

9. The method as defined in claim 1, wherein said acrylic resin is a polymerized copolymer of methyl and n-butyl methacrylate.

10. The method as defined in claim 1, including, before exposing said pattern to an elevated temperature,
    exposing said pattern to a temperature of from about 140°F. to about 160°F. to transform same to a nontacky condition;
    screening a second pattern of decorating composition onto said glass substrate through a screen contacting the first applied pattern without smearing said first pattern.

11. The method as defined in claim 10, wherein said second pattern is screened with a decorating composition having a composition within the compositional ranges of the first applied decorating composition.

12. The method as defined in claim 10, wherein said step of exposing said pattern to a temperature of from about 140°F. to about 160°F. is accomplished by exposing said pattern to a stream of heated air.

13. The method of decorating a glass substrate comprising the steps of:
providing a liquid vehicle which on a percent by weight basis of total liquid vehicle consists essentially of
from about 1.6 percent to about 13.0 percent by weight of an aqueous emulsion of 30 to 60 percent solids content of a copolymer of N-vinyl pyrrolidone and a copolymerizable vinyl ester selected from at least one of the group consisting of vinyl acetate, vinyl propionate and vinyl butyrate,
optionally from about 1.2 percent to about 6.4 percent by weight of a sulfonated anionic surfactant,
optionally from about 3.0 percent to about 13.0 percent by weight of at least one of the group consisting essentially of a copolymer of methyl methacrylate and normal butyl methacrylate, and sucrose benzoate, and
an organic solvent having a boiling point temperature within the temperature range of from about 212°F. to about 374°F.;
preparing a decorating composition by admixing a glass or ceramic frit and said liquid together in such amounts that said frit constitutes about from about 40 percent to about 60 percent of said decorating composition;
screening said decorating composition through a screen onto the surface of said glass substrate in a preselected pattern defined by the openings in said screen; converting said pattern to a nontacky condition by exposing same to a temperature of from about 140°F. to about 160°F. for up to about one minute;
screening a second pattern of decorating composition onto said glass substrate through a screen contacting the first applied pattern without smearing said first pattern;
concurrently exposing each said pattern to an elevated temperature selected to dissipate said liquid vehicle and fuse said frit in said pattern to said glass substrate.

* * * * *

UNITED STATES PATENT AND TRADEMARK OFFICE
CERTIFICATE OF CORRECTION

PATENT NO. : 3,793,053
DATED : February 19, 1974
INVENTOR(S) : Charles L. Benford, Jr. et al.

It is certified that error appears in the above-identified patent and that said Letters Patent are hereby corrected as shown below:

Col. 3, line 43, "is" should be --in--. Col. 7, line 38, "others" should be --ethers--.

Signed and Sealed this

Twelfth Day of April 1977

[SEAL]

Attest:

RUTH C. MASON
Attesting Officer

C. MARSHALL DANN
Commissioner of Patents and Trademarks